US008037972B2

(12) United States Patent
Fujita

(10) Patent No.: US 8,037,972 B2
(45) Date of Patent: Oct. 18, 2011

(54) VEHICLE PARKING SYSTEM AND METHOD FOR CONTROLLING THE SAME

(75) Inventor: Kozo Fujita, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 903 days.

(21) Appl. No.: 12/039,135

(22) Filed: Feb. 28, 2008

(65) Prior Publication Data

US 2008/0217123 A1 Sep. 11, 2008

(30) Foreign Application Priority Data

Mar. 5, 2007 (JP) ................................ 2007-054682

(51) Int. Cl.
*B60T 1/00* (2006.01)

(52) U.S. Cl. ........... 188/31; 188/265; 188/156; 188/161

(58) Field of Classification Search ............ 188/31, 188/265, 72.1, 156–163, 72.6; 303/124, 303/162, 20
See application file for complete search history.

(56) References Cited

U.S. PATENT DOCUMENTS

| | | | | | |
|---|---|---|---|---|---|
| 6,139,117 | A | * | 10/2000 | Shirai et al. ................ | 303/3 |
| 6,626,270 | B2 | * | 9/2003 | Drennen et al. ............. | 188/72.1 |
| 6,915,883 | B2 | * | 7/2005 | Watanabe et al. ............ | 188/156 |
| 7,850,255 | B2 | * | 12/2010 | Kawahara et al. ......... | 303/122.1 |
| 2005/0258683 | A1 | | 11/2005 | Yamaguchi | |

FOREIGN PATENT DOCUMENTS

| | | |
|---|---|---|
| DE | 103 56 096 A1 | 6/2005 |
| DE | 10 2004 047 100 B3 | 3/2006 |
| DE | 10 2005 046 278 A1 | 4/2006 |
| DE | 10 2005 005 669 A1 | 8/2006 |
| JP | 6-1157 | 1/1994 |
| JP | 2003-327101 | 11/2003 |
| JP | 2004-242371 | 8/2004 |
| JP | 2004-308848 | 11/2004 |
| JP | 2005-192369 | 7/2005 |
| JP | 2006-27415 | 2/2006 |
| JP | 2006-162022 | 6/2006 |
| JP | 2007-284036 | 11/2007 |

* cited by examiner

*Primary Examiner* — Melanie Torres Williams
(74) *Attorney, Agent, or Firm* — Oblon, Spivak, McClelland, Maier & Neustadt, L.L.P.

(57) ABSTRACT

In a vehicle parking system, when a selected shift position is changed between Park and a shift position other than Park, if both an electric motor of an electric parking lock mechanism and an electric motor of an electric parking brake mechanism are operated, these electric motors are started in such a manner that the times at which striking currents supplied to these electric motors reach their peaks are staggered.

19 Claims, 8 Drawing Sheets

EXAMPLE OF CURRENT DURING CONTROL

VEHICLE PARKING SYSTEM AND METHOD FOR CONTROLLING THE SAME

INCORPORATION BY REFERENCE

The disclosure of Japanese Patent Application No. 2007-054682 filed on Mar. 5, 2007 including the specification, drawings and abstract is incorporated herein by reference in its entirety.

BACKGROUND OF THE INVENTION

1. Field of the Invention

The invention relates to a vehicle parking system and a method for controlling the same. More specifically, the invention relates to a control over multiple electromagnetically-driven actuators in a vehicle parking system that includes multiple devices.

2. Description of the Related Art

Japanese Patent Application Publication No. 2006-162022 (JP-A-2006-162022) describes a parking brake system in which an electric motor is rotated to operate a parking brake mechanism when the shift position selected by a shift position selection device is Park. Japanese Patent Application Publication No. 2006-27415 (JP-A-2006-27415) describes a parking brake system in which an electric motor is rotated to apply parking brakes when the shift position selected by a shift position selection device is a shift position other than Park, Neutral and Reverse, and a service brake operating member is operated. Japanese Patent Application Publication No. 2003-327101 (JP-A-2003-327101) describes a parking brake system in which an electric motor is rotated to automatically release parking brakes when the shift position selected by a shift position selection device is changed from Drive to Reverse or changed from Reverse to Drive. Japanese Patent Application Publication No. JP-06-1157 (JP-A-06-1157) describes a parking lock system in which an electric motor is rotated to operate a parking lock mechanism when the shift position selected by a shift position selection device is changed from a shift position other than Park to Park.

SUMMARY OF THE INVENTION

The invention enables a parking lock mechanism and a parking brake mechanism to operate stably in a vehicle parking system including both the parking lock mechanism and the parking brake mechanism.

A first aspect of the invention relates to a vehicle parking system, including: a parking lock mechanism that is provided in a drive power transfer system of a vehicle, that includes a first electromagnetically-driven actuator which is operated by electric power supplied from a power supply unit, and that mechanically interrupts the rotation of a drive power transfer shaft, which transfers drive power from a drive power source of the vehicle to a drive wheel, by operating the first electromagnetically-driven actuator; a parking brake mechanism that includes a brake provided to the wheel of the vehicle and a second electromagnetically-driven actuator which is operated by electric power supplied from the power supply unit, and that applies the brake by operating the second electromagnetically-driven actuator to suppress the rotation of the wheel; and an electromagnetically-driven actuator control unit that starts the first electromagnetically-driven actuator and the second electromagnetically-driven actuator at staggered times, when both the parking lock mechanism and the parking brake mechanism are operated based on a predetermined operation command.

The vehicle parking system according to the first aspect of the invention includes the parking lock mechanism and the parking brake mechanism. The parking lock mechanism and the parking brake mechanism are operated based on the same operation command. The first electromagnetically-driven actuator of the parking lock mechanism and the second electromagnetically-driven actuator of the parking brake mechanism are connected to the same power supply unit. Therefore, in the case where both the first electromagnetically-driven actuator and the second electromagnetically-driven actuator are operated, a large magnitude of electric current is supplied from the power supply unit. For example, in the case where both the first electromagnetically-driven actuator and the second electromagnetically-driven actuator are electric motors, when the electric motors are started (when supply of electric currents to the electric motors, which have been stopped because electric currents have not been supplied thereto, is started), a large magnitude of electric current is momentarily supplied from the power supply unit. The electric current supplied to the electric motor when it is started will be referred to as the striking current (electric current that is transiently supplied to the electric motor). If both of the two electric motors are started based on the operation command and the times at which the magnitudes of the striking currents reach their peaks coincide with each other, the magnitude of the electric current to be supplied from the power supply unit considerably increases, which may cause a significant voltage drop in the power supply unit. In contrast, if the two electric motors are started at staggered times so that the times at which the magnitudes of the striking currents supplied to the two electric motors reach their peaks do not coincide with each other, it is possible to suppress occurrence of a significant voltage drop in the power supply unit and to operate the two electric motors stably. Note that, none of JP-A-2006-162022, JP-A-2006-27415, JP-A-2003-327101, and JP-A-06-1157 has a description that two electromagnetically-driven actuators are operated based on an operation command. In addition, even if the features described in JP-A-2006-162022, JP-A-2006-27415, JP-A-2003-327101, and JP-A-06-1157 are combined with each other, there is found no description concerning a problem that may be caused when two electromagnetically-driven actuators are operated based on an operation command. In the case where each of the first electromagnetically-driven actuator and the second electromagnetically-driven actuator is an electric motor or a solenoid valve, when the first electromagnetically-driven actuator is operated to change the state from the state in which the rotation of the drive power transfer shaft is permitted to the state in which the rotation of the drive power transfer shaft is interrupted (hereinafter, referred to as "actual operation of the first electromagnetically-driven actuator is performed") in the parking lock mechanism, an electric current, of which the magnitude corresponds to the load applied to the first electromagnetically-driven actuator, passes through the first electromagnetically-driven actuator. Similarly, in the parking brake mechanism, when the second electromagnetically-driven actuator is operated to change the brake-application state from the brake-released state to the brake-applied state (hereinafter, referred to as "actual operation of the second electromagnetically-driven actuator is performed"), an electric current, of which the magnitude corresponds to the load applied to the second electromagnetically-driven actuator, passes through the second electromagnetically-driven actuator. If the times at which the magnitudes of the electric currents that pass through the first electromagnetically-driven actuator and the second electromagnetically-driven actuator during the actual operations reach their peaks coincide with each other, the magnitude of electric current that should be supplied from the power supply unit increases. In contrast, if the first electromagnetically-driven actuator and the second electromagnetically-driven actuator are started at staggered times so that the loads applied to the two electromagnetically-driven actuators during the actual operation reach their peaks do not coincide with each other, it is possible to suppress occurrence of a significant voltage drop in the power supply unit, and to operate the first electromagnetically-driven actuator and the second electromagnetically-driven actuator stably. The wheels to which the parking brakes are provided may be the drive wheels or the wheels other than the drive wheels. When the parking brakes are provided to the drive wheels, the rotation of the drive wheels is suppressed by both the parking brake mechanism and the parking lock mechanism.

In the first aspect of the invention, the electromagnetically-driven actuator control unit may include a peak staggering electromagnetically-driven actuator control unit that starts the first electromagnetically-driven actuator and the second electromagnetically-driven actuator in such a manner that the time at which the magnitude of the electric current consumed in the first electromagnetically-driven actuator reaches its peak and the time at which the magnitude of the electric current consumed in the second electromagnetically-driven actuator reaches its peak are staggered.

In the first aspect of the invention, the electromagnetically-driven actuator control unit may include a peak consumption current-based electromagnetically-driven actuator control unit that first starts one of the first electromagnetically-driven actuator and the second electromagnetically-driven actuator, in which an electric current having a lower peak value is consumed.

In the first aspect of the invention, the peak value of the electric current consumed in the first electromagnetically-driven actuator may be smaller than the peak value of the electric current consumed in the second electromagnetically-driven actuator, and the electromagnetically-driven actuator control unit may include a peak consumption current-based electromagnetically-driven actuator control unit that starts the first electromagnetically-driven actuator before starting the second electromagnetically-driven actuator.

When both the first electromagnetically-driven actuator and the second electromagnetically-driven actuator are electric motors, electric circuits that include the respective electric motors and a direct-current power supply unit (the power supply unit) are formed, as shown in FIG. 6A. In each of the electric circuits, the magnitude of the electric current that passes through the electric motor is expressed by Equation 1.

$$i = (Et - Ec)/R \qquad \text{Equation 1}$$

In Equation 1, Et denotes the output voltage from the power supply unit, Ec denotes the counterelectromotive force, and R denotes the resistance in the electric circuit. The resistance R is the resistance in the entirety of the circuit including the resistance in the electric motor itself, the resistance in the wire included in the electric circuit, etc. The counterelectromotive force Ec is expressed by Equation 2. In Equation 2, K is a coefficient, $\phi$ is a magnetic field flux, and n is a rotational speed of the electric motor.

$$Ec = K \times \phi \times n \qquad \text{Equation 2}$$

According to Equation 2, when the rotational speed n is 0, the counterelectromotive force Ec is 0. Therefore, it is understood according to Equations 1 and 2 that, when the electric motor is started (when the switch is trued on), the electric current, of which the magnitude is expressed by Equation 3, passes through the electric motor.

$$i = Et/R \qquad \text{Equation 3}$$

As expressed by Equation 2, when the rotational speed n of the electric motor increases, the counterelectromotive force Ec also increases. Therefore, as expressed by Equation 1, the magnitude of the electric current i that passes through the electric motor decreases. When the rotational speed n becomes constant and, therefore, the counterelectromotive force Ec becomes constant, the magnitude of the electric current that passes through the electric motor also becomes constant. Accordingly, when the electric motor is started, the magnitude of the electric current changes in a manner shown in FIG. 6B. That is, the magnitude of the electric current abruptly increases, reaches its peak value imax, and then decreases as the rotational speed n increases. Hereafter, the electric current that transiently passes through the electric motor when it is started (the electric current of which the magnitude increases, reaches its peak, and then decreases) will be referred to as the striking current (although the term "striking current" sometimes referred to as the magnitude of the peak value imax, the term "striking current" in this specification indicates the electric current until its magnitude decreases). As shown in FIG. 6B, after the striking current passes through the electric motor, the actual operation of the electric motor is started. The magnitude of the electric current that passes through the electric motor increases as the load applied to the electric motor increases, and then reaches the peak value ic. The peak value ic of the electric current that passes through the electric motor during the actual operation is smaller than the peak value imax of the striking current. Based on the above-described facts, if the two electric motors are started in such a manner that the times at which the magnitudes of the striking currents reach their peaks do not coincide with each other, it is possible to suppress occurrence of a significant voltage drop in the power supply unit. When a resistance is provided in the electric circuit including the electric motor in such a manner that the resistance is in series with the electric motor, it is possible to make the magnitude of the striking current small. When the resistance is a variable resistance, it is possible to make the magnitude of the striking current small, thereby suppressing occurrence of the situation in which the magnitude of the electric current that passes through the electric motor during the actual operation does not become small. The resistance that is provided to make the peak value of the striking current small will be referred to as a starter. In the electric circuits provided with the electric motors, if a starter is not provided in any of the electric circuits, or the same starters are provided in the electric circuits, the peak value of the striking current that passes through the electric motor is larger when the capacity of the electric motor (the peak value of the torque that can be output from the electric motor, and that corresponds to the peak value of the consumption current during the actual operation) is large than when the capacity of the electric motor is small. When a comparison is made between the first electric motor, which serves as the first electromagnetically-driven actuator, and the second electric motor, which serves as the second electromagnetically-driven actuator, it is found that a larger magnitude of electric current passes through the second electric motor during the actual operation (the electric motor of the parking brake mechanism needs to output a larger power). Therefore, the peak value of the striking current is larger in the second electric motor than in the first electric motor. Therefore, if the first electric motor, to which the striking current having a smaller peak value is supplied, is started first, and the second electric motor, to which the striking current having a larger peak value is supplied, is then started, even if the voltage of the power supply unit is low, it is possible to suppress occurrence of the situation in which the power supply unit becomes unusable and to operate both the first electric motor and the second electric motor appropriately. In the case where each of the first electromagnetically-driven actuator and the second electromagnetically-driven actuator is an electric motor or a solenoid valve, if the two electromagnetically-driven actuators are started at staggered times so that the times at which the magnitudes of the consumption currents reach their peaks do not coincide with each other, it is possible to suppress occurrence of the situation in which a significant voltage drop occurs in the power supply unit. In this case, if the first electromagnetically-driven actuator is started first, it is possible to appropriately suppress occurrence of the situation in which the power supply unit becomes unusable.

In the first aspect of the invention, the electromagnetically-driven actuator control unit may include a post-current reduction control-start unit that starts one of the first electromagnetically-driven actuator and the second electromagnetically-driven actuator, when the magnitude of the electric current consumed in the other electromagnetically-driven actuator is changed from a value larger than a predetermined value to a value equal to or smaller than the predetermined value.

In the first aspect of the invention, the electromagnetically-driven actuator control unit may include a post-current reduction control-start unit that starts the second electromagnetically-driven actuator, when the magnitude of the electric current consumed in the first electromagnetically-driven actuator is changed from a value larger than a predetermined value to a value equal to or smaller than the predetermined value.

If the magnitude of the electric current that actually passes through the electric motor is detected, it is possible to determine whether the magnitude of the striking current changes from a value larger than the predetermined value to a value equal to or smaller than the predetermined value. When the magnitude of the striking current is equal to or smaller than the predetermined value and the gradient of a change in the magnitude of the striking current is a negative value, it is determined that the magnitude of the striking current is changed from a value larger than the predetermined value to a value equal to or smaller than the predetermined value. In contrast, it is possible to determine whether the magnitude of the striking current decreases to a value equal to or smaller than the predetermined value, based on the time that has elapsed since the electric motor is started. The time that is required from when the electric motor is started until when the magnitude of the striking current reaches its peak, the time that is required until the magnitude of the striking current becomes small, etc. are determined in advance. Therefore, based on the time described above, it is possible to determine the time Ts that is required from when the electric motor is started (when the switch is turned on) until when the magnitude of the striking current decreases to a value equal to or smaller than the predetermined value "is" as shown in FIG. 6B. If one of the electric motors is started when the magnitude of the striking current that passes through the other electric motor is decreased from a value larger than the predetermined value to a value equal to or smaller than the predetermined value, it is possible to start the electric motor, which is to be started later, at the earliest possible time, while suppressing occurrence of the situation in which the times at which the magnitudes of the striking currents reach their peaks coincide with each other. Especially, when the electric motor, which is to be started later, is the second electric motor included in the parking brake mechanism, if the second electric motor is started at the earliest possible time, it is possible to minimize the delay in application of the parking brake. The predetermined value used to set the start time of the electric motor, which is to be started later, is a value smaller than the peak value of the striking current. However, if the predetermined value is increased, it is possible to start the electric motor, which is to be started later, at an earlier time. If the predetermined value is decreased, it is possible to suppress occurrence of the situation in which a large magnitude of electric current is supplied from the power supply unit. Based on these facts, the predetermined value may be a value equal to or smaller than four-fifths of the peak value of the striking current, a value equal to or smaller than three-fifths of the peak value of the striking current, a value equal to or smaller than a half of the peak value of the striking current, a value equal to or smaller than one-thirds of the peak value of the striking current, a value equal to or smaller than one-fifths of the peak value of the striking current, or the like. In the case where the electromagnetically-driven actuators are solenoid valves and the electric power supply unit is a direct-current power supply unit, it is considered that the magnitude of the consumption current is changed from a value larger than the predetermined value to a value equal to or smaller than the predetermined value when the operations of the solenoid valves are stopped. Therefore, after the operation of the solenoid valve that is started first is stopped, the other electromagnetically-driven actuator (solenoid valve) may be started.

In the first aspect of the invention, the electromagnetically-driven actuator control unit may include a post-actual operation-start starting unit that starts one of the first electromagnetically-driven actuator and the second electromagnetically-driven actuator after the actual operation of the other electromagnetically-driven actuator is started.

Whether the actual operation is started is determined by detecting, using a position sensor, a change in the position of a movable member (for example, a parking rod or an equalizer) that is a component of the parking lock mechanism or the parking brake mechanism, by detecting a change in a force applied to a force transfer member (for example, a cable) that is a component of the parking brake mechanism, or by detecting a change in the brake application force using a strain sensor. As will be described later in detail, whether the actual operation is started is determined based on the magnitude of the electric current (the magnitude corresponds to the load to the electric motor) that passes through the electric motor.

In the first aspect of the invention, the electromagnetically-driven actuator control unit may include a post-current-increase starting unit that starts one of the first electromagnetically-driven actuator and the second electromagnetically-driven actuator, when the magnitude of the electric current consumed in the other electromagnetically-driven actuator exceeds a predetermined value after the time that has elapsed since the other electromagnetically-driven actuator is started exceeds a predetermined time.

After the striking current passes through the electric motor, the magnitude of the electric motor that is supplied to the electric motor is increased with an increase in the load applied to the electric motor. As described above, the time that is required from when the electric motor is started until when the magnitude of the striking current becomes small is determined. Therefore, it is determined that the actual operation is started, when the magnitude of the electric current changes to a value larger than the predetermined value after the magnitude of the striking current becomes small. For example, as shown in FIG. 6B, one of the electric motors may be started, when the magnitude of the electric current that is supplied to the other electric motor becomes larger than the predetermined value id after the predetermined post-start time Ts has elapsed since the other electric motor is started. When the electromagnetically-driven actuator is a solenoid valve, it may be determined that the actual operation is started when the magnitude of the electric current that changes based on the load becomes larger than the predetermined value.

In the first aspect of the invention, the electromagnetically-driven control unit may include a current detection unit that detects the magnitude of the electric current that passes through one of the first electromagnetically-driven actuator and the second electromagnetically-driven actuator.

As described above, the electromagnetically-driven actuator that is started later may be started when the time that has elapsed since the electromagnetically-driven actuator, which is started first, reaches the predetermined time, or may be started at a time that is determined based on the magnitude of the electric current that passes through the electromagnetically-driven actuator which is started first. However, it is preferable to start the electromagnetically-driven actuator, which is to be started later, at the time that is determined based on the magnitude of the electric current that passes through the electromagnetically-driven actuator which is started first. This is because, it is possible to more accurately determine the magnitude of the electric current consumed in the electromagnetically-driven actuator which is started first. Therefore, it is possible to more reliably suppress occurrence of the situation in which a significant voltage drop occurs in the power supply unit.

In the first aspect of the invention, the electromagnetically-driven control unit may include a stagger control start unit that starts one of the first electromagnetically-driven actuator and the second electromagnetically-driven actuator after a predetermined time has elapsed since the other electromagnetically-driven actuator is started.

As described above, the predetermined time may be a time that is required until the magnitude of the striking current decreases to a value equal to or smaller than the predetermined value, or the time that is required until the actual operation is started. In the vehicle parking system in which one of the electromagnetically-driven actuators is started after the predetermined time has elapsed since the other electromagnetically-driven actuator is started, it is no longer necessary to detect the magnitude of the electric current.

In the first aspect of the invention, both the first electromagnetically-driven actuator and the second electromagnetically-driven actuator may be electric motors.

The electric motors may be, for example, direct-current electric motors. In this case, the power supply unit is a direct-current power supply unit, for example, a unit that includes a power storage device such as a battery.

In the first aspect of the invention, both the first electromagnetically-driven actuator and the second electromagnetically-driven actuator may be electric motors, the parking lock mechanism may include a locked-state maintaining mechanism that maintains a state, in which the rotation of the drive power transfer shaft is interrupted, with supply of an electric current to the electric motor stopped; and the parking brake mechanism may include a brake-applied state maintaining mechanism that maintains a brake-applied state, in which the rotation of the wheel is suppressed, with supply of an electric current to the electric motor stopped.

Because each of the parking lock mechanism and the parking brake mechanism is provided with the maintaining mechanism, even if an electric current is not supplied to the electric motor, the state is maintained. Namely, the electric motor is started, when the state is changed from the state in which the rotation of the drive power transfer shaft is permitted to the state in which the rotation of the drive power transfer shaft is interrupted or when the state is changed from the state in which the rotation of the drive power transfer shaft is interrupted to the state in which the rotation of the drive power transfer shaft is permitted in the parking lock mechanism, or when the brake application state is changed from the state in which the brake is released to the state in which the brake is applied, when the brake application state is changed from the state in which the brake is applied to the state in which the brake is released, or when the brake application force is changed in the brake-applied state in the parking brake mechanism. In the first aspect of the invention, both the parking lock mechanism and the parking brake mechanism are operated based on an operation command, when the state is changed from the state in which the rotation of the drive power transfer shaft is permitted to the state in which the rotation of the drive power transfer shaft is interrupted and the brake application state is changed from the brake-released state to the brake-applied state, or when the state is changed from the state in which the rotation of the drive power transfer shaft is interrupted to the state in which the rotation of the drive power transfer shaft is permitted and the brake application state is changed from the brake-applied state to the brake-released state. Each of the locked-state maintaining mechanism and the brake-applied state maintaining mechanism may include a clutch, or may include a worm gear and a worm wheel.

In the first aspect of the invention, a shift position selection unit that selects a shift position of an automatic transmission of the vehicle may be further provided, and the electromagnetically-driven actuator control unit may include a shift position-linked control unit that determines that an operation command is issued and starts both the first electromagnetically-driven actuator and the second electromagnetically-driven actuator, when a shift position selected by the shift position selection unit is changed from a shift position other than Park to Park or when a shift position selected by the shift position selection unit is changed from Park to a shift position other than Park.

The shift position of the automatic transmission is automatically controlled based on, for example, a command from the shift position selection unit. Namely, the shift position selection unit and the automatic transmission are not mechanically connected to each other, and the shift position of the automatic transmission is electrically controlled so that the shift position of the automatic transmission matches the selected shift position. When the shift position selected by the shift position selection unit is changed from a shift position other than Park to Park, the shift position of the automatic transmission is changed from a shift position other than Park to Park and the parking lock mechanism is operated. Namely, the drive power from the drive power source of the vehicle is not transferred to the output shaft of the automatic transmission, and the state is changed from the state in which the rotation of the drive power transfer shaft is permitted to the state in which the rotation of the drive power transfer shaft is mechanically interrupted. In addition, the parking brake mechanism is operated, and the brake application state is changed from the brake-released state to the brake-applied state by the second electromagnetically-driven actuator. When the selected shift position is changed from Park to a shift position other than Park (for example, Drive or Reverse), the shift position of the automatic transmission is changed to Drive or Reverse by the first electromagnetically-driven actuator, and the state is changed from the state in which the rotation of the drive power transfer shaft is interrupted to the state in which the rotation of the drive power transfer shaft is permitted. In addition, the brake-application state is changed from the brake-applied state to the brake-released state by the second electromagnetically-driven actuator.

In the first aspect of the invention, the parking lock mechanism may include a shift position-linked control unit that changes, by operating the first electromagnetically-driven actuator, the shift position of an automatic transmission of the vehicle to Park, and changes the state from the state in which the rotation of the drive power transfer shaft, which extends between an output shaft of the automatic transmission and the wheel is permitted to the state in which the rotation of the drive power transfer shaft is mechanically interrupted. The number of components is smaller and the cost is lower, when the shift position of the automatic transmission is changed by operating the first electromagnetically-driven actuator than when a change of the shift position of the automatic transmission and the operation of the parking lock mechanism are performed by different actuators.

In the first aspect of the invention, the brake may be a friction brake that suppresses the rotation of the wheel by pushing a friction member against a brake rotating body that rotates together with the wheel; and the parking brake mechanism may include a cable that transfers drive power from the second electromagnetically-driven actuator to the friction brake.

A second aspect of the invention relates to a vehicle parking system, including: a parking lock mechanism that is provided in a drive power transfer system of a vehicle, that includes a first electric motor which is operated by electric power supplied from a power supply unit, and that mechanically interrupts the rotation of a drive power transfer shaft, which transfers drive power from a drive power source of the vehicle to a drive wheel, by operating the first electric motor; a parking brake mechanism that includes a brake provided to the wheel of the vehicle and a second electric motor which is operated by electric power supplied from the power supply unit, and that applies the brake by operating the second electric motor to suppress the rotation of the wheel; and an electric motor control unit that starts the first electric motor and the second electric motor in such a manner that the time at which the magnitude of an electric current consumed in the first electric motor reaches its peak and the time at which the magnitude of an electric current consumed in the second electric motor reaches its peak are staggered.

In the second aspect of the invention, when the first electric motor and the second electric motor are connected to the same electric power supply unit, these electric motors are started in such a manner that the times at which the magnitudes of the striking currents reach their peaks do not coincide with each other. The technical features of the first aspect of the invention may be employed in the second aspect of the invention. If the times at which the magnitudes of the striking currents reach their peaks do not coincide with each other, the first electric motor and the second electric motor may be started at the same time.

A third aspect of the invention relates to a method for controlling a vehicle parking system which includes: a parking lock mechanism that is provided in a drive power transfer system of a vehicle, that includes a first electromagnetically-driven actuator which is operated by electric power supplied from a power supply unit, and that mechanically interrupts the rotation of a drive power transfer shaft, which transfers drive power from a drive power source of the vehicle to a drive wheel, by operating the first electromagnetically-driven actuator; and a parking brake mechanism that includes a brake provided to the wheel of the vehicle and a second electromagnetically-driven actuator which is operated by electric power supplied from the power supply unit, and that applies the brake by operating the second electromagnetically-driven actuator to suppress the rotation of the wheel. According to the method, the first electromagnetically-driven actuator and the second electromagnetically-driven actuator are started at staggered times, when both the parking lock mechanism and the parking brake mechanism are operated based on a predetermined operation command.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein.

DETAILED DESCRIPTION OF THE EMBODIMENT

Figure 1:
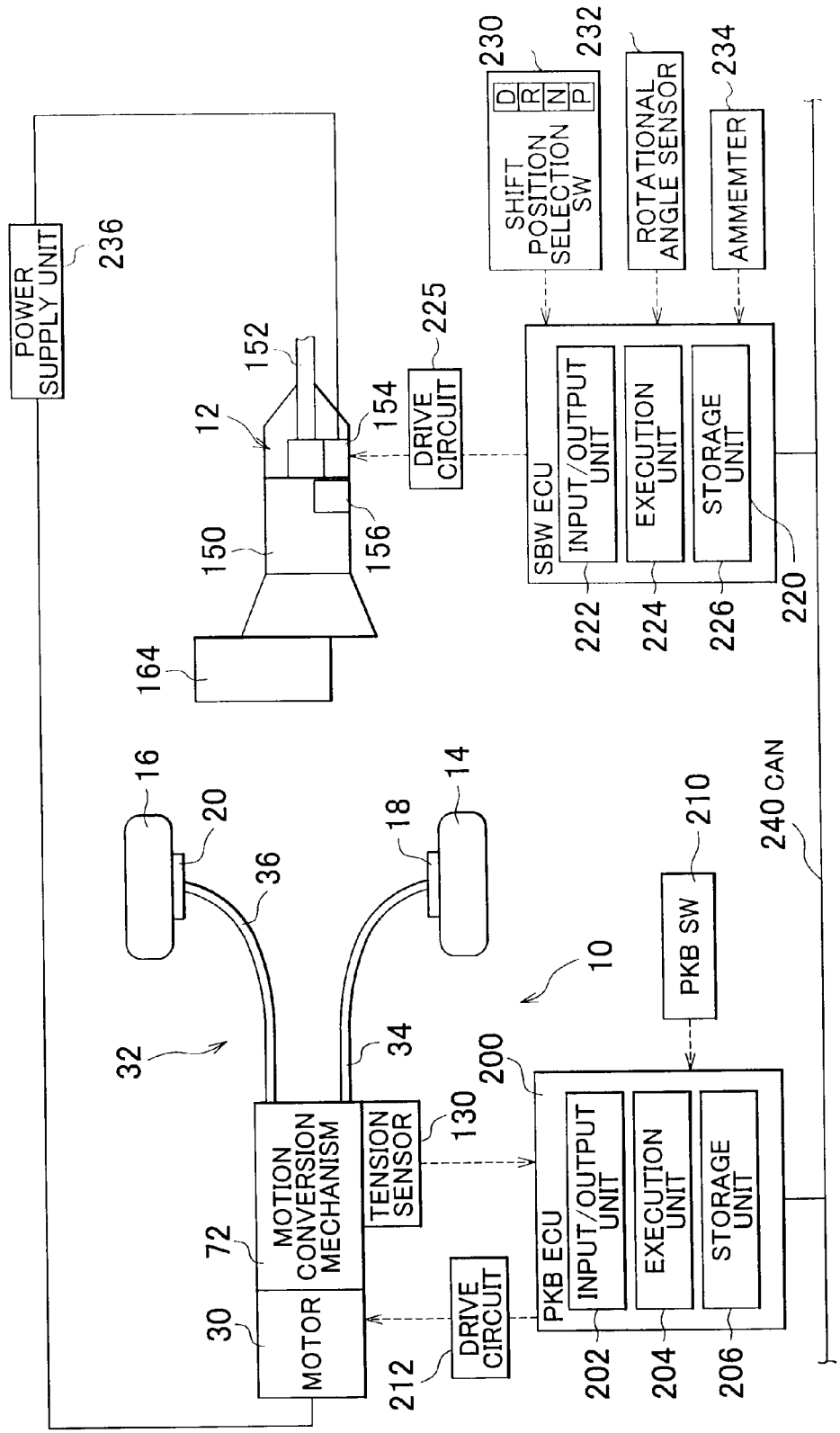
FIG. 1 is a view schematically showing the entirety of a vehicle parking system according to an embodiment of the invention.
Figure 2:
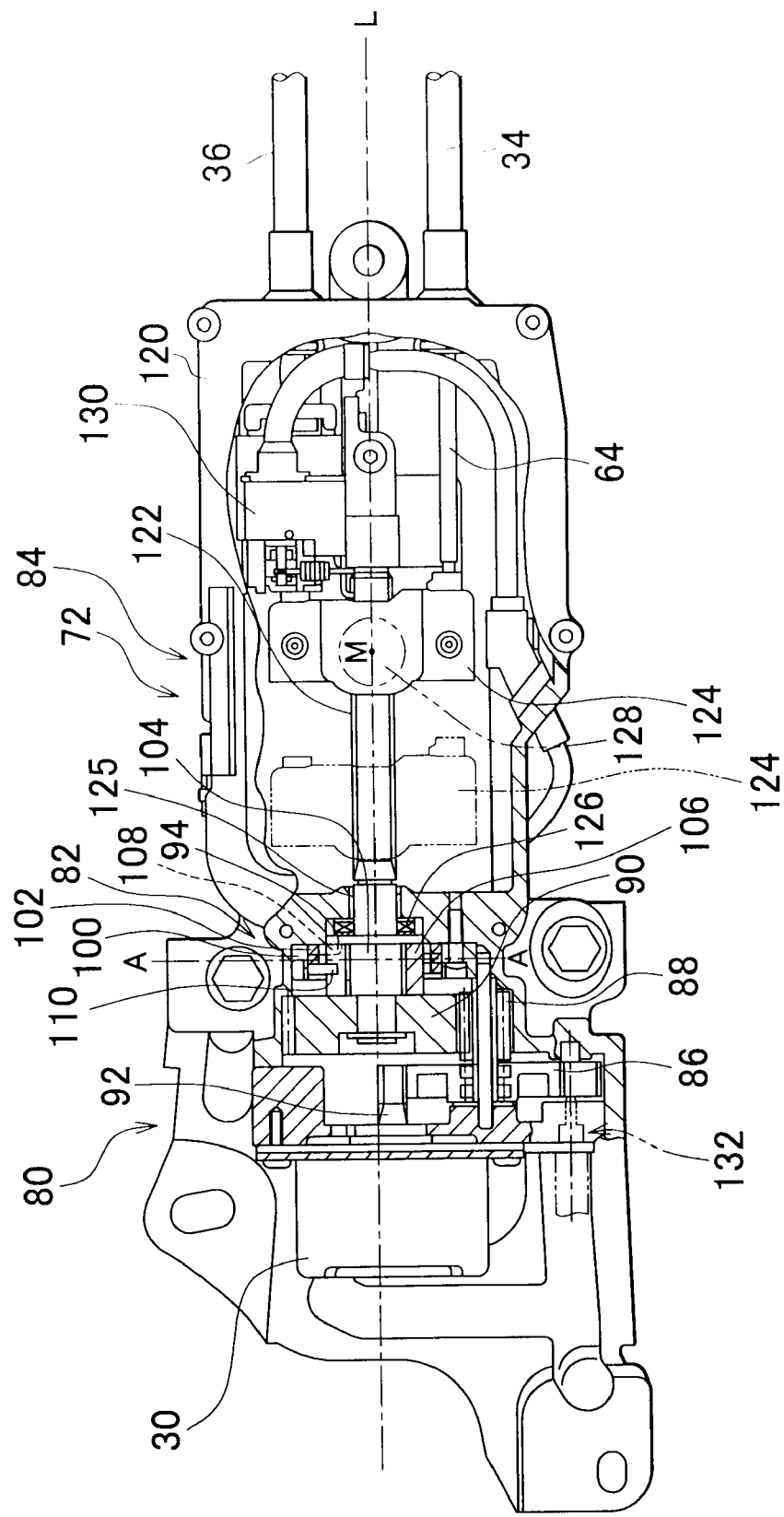
FIG. 2 is a cross-sectional view showing a motion-conversion mechanism of an electric parking brake mechanism included in the vehicle parking system.
Figure 3:
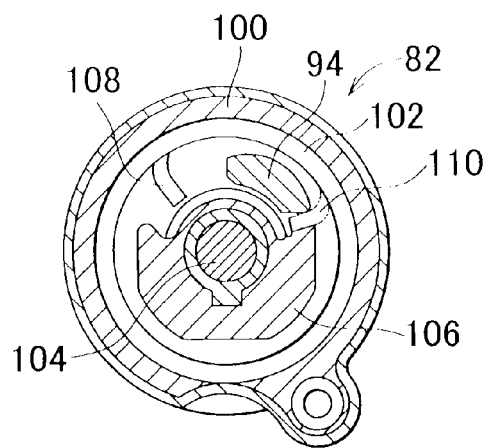
FIG. 3 is a cross-sectional view taken along the line 3A-3A in FIG. 2.
Figure 4:
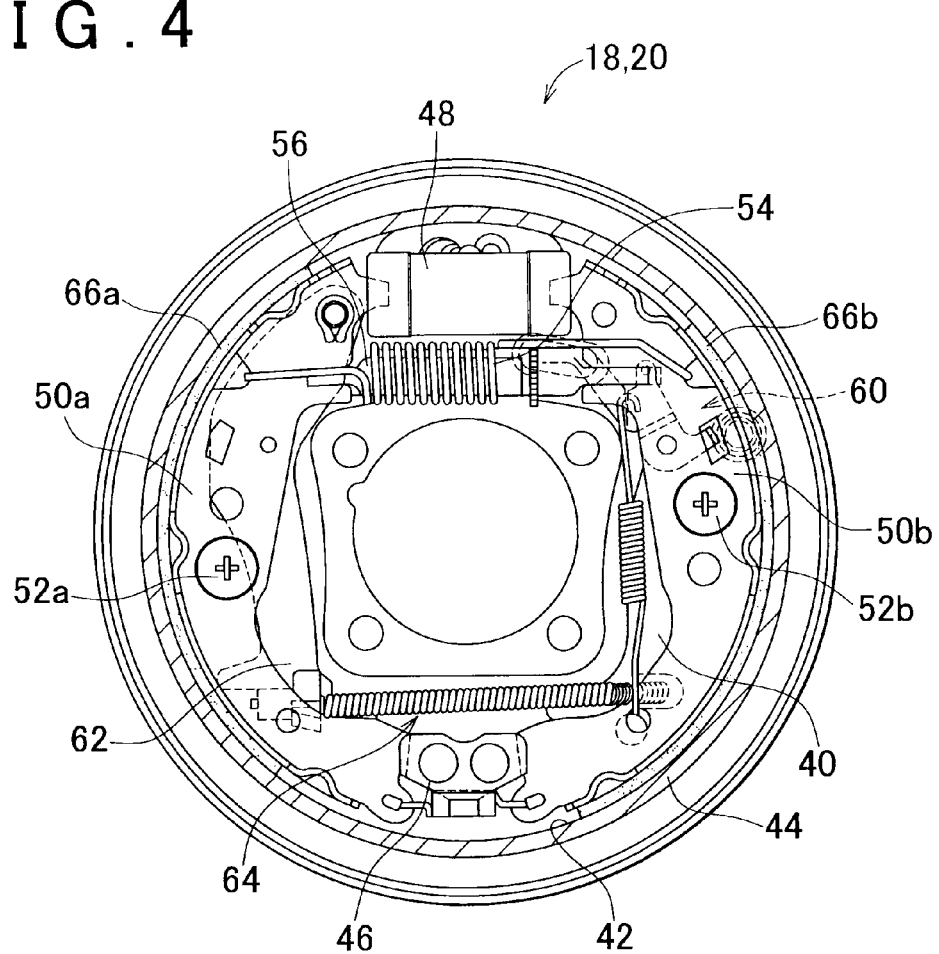
FIG. 4 is a view showing a brake in the electric parking brake mechanism.

Hereafter, a vehicle parking system according to an embodiment of the invention will be described with reference to the accompanying drawings. FIG. 1 shows an electric parking brake mechanism 10 and an electric parking lock mechanism 12. As shown in FIGS. 1 to 4, the electric parking brake mechanism 10 includes brakes 18 and 20 that are provided to a rear left wheel 14 and a rear right wheel 16 of the vehicle, respectively, and a pushing unit 32 that includes a second electric motor 30 that serves as a second electromagnetically-driven actuator (hereinafter, referred to as "brake motor 30"). In the electric parking brake mechanism 10, cables 34 and 36 are pulled in response to an operation of the brake motor 30, whereby the brakes 18 and 20 are applied. In the embodiment of the invention, the brakes 18 and 20 are drum brakes that serve as friction brakes, as shown in FIG. 4. The drum brakes 18 and 20 have the same structure. The drum brakes 18 and 20 each include a backing plate 40, which is a non-rotating body that is fitted to a vehicle body (not shown), and a drum 44 that has a friction face 42 on the inner peripheral face and that serves as a brake rotating body which is able to rotate together with the wheel 14 (16). An anchor member 46 and a brake cylinder 48 are provided at positions that are apart from each other in the radial direction of the backing plate 40. The anchor member 46 is fixed to the backing plate 40. Between the anchor member 46 and the brake cylinder 48, paired brake shoes 50a and 50b, each of which has an arc-shape, are arranged so as to face the inner peripheral face (the friction face) 42 of the drum 44. The brake shoes 50a and 50b are fitted to the backing plate 40 by shoe hold-down units 52a and 52b so as to be movable along the face of the backing brake 40. An axle shaft (not shown) passes through a through-hole that is formed at the center of the backing plate 40. The brake shoes 50a and 50b are operatively connected to each other, at one ends, by the brake cylinder 48, and contact, at the other ends, to the anchor member 46 to be pivotably supported. Biasing forces are applied to the brake shoes 50a and 50b by a return spring 54 so that the one ends of the brakes shoes 50a and 50b approach each other. A strut 56 is provided between the brake shoes 50a and 50b. An automatic adjuster 60 is provided to each of the drum brakes 18 and 20 to automatically adjust a clearance between the brake shoes 50a and 50b, and the inner peripheral face (the friction face) 42 of the drum 44.

A brake lever 62, which serves as a brake operating member, is held, at one end, by the brake shoe 50a, and is connected, at the other end, to an inner cable 64 of the brake cable 34 (36) (see FIG. 1: hereinafter, referred to as "cable"). When the inner cable 64 is pulled, the brake lever 62 pivots. The pivot motion of the brake lever 62 increases the distance between the brakes shoes 50a and 50b, whereby brake linings 66a and 66b are pushed against the inner peripheral face (the friction face) 42 of the drum 44. As a result, the drum brake 18 (20), which serves as the parking brake, is applied. The force with which the brake linings 66a and 66b are pushed against the inner peripheral face 42 corresponds to the force with which the inner cable 64 is pulled. Meanwhile, when hydraulic pressure is supplied to the brake cylinder 48, the distance between the brake shoes 50a and 50b is increased, whereby the brake linings 66a and 66b are pushed against the inner peripheral face (the friction face) 42 of the drum 44. As a result, the drum brake 18 (20), which serves as the service brake, is applied. Hereinafter, the drum brakes 18 and 20 will be referred to as the parking brakes 18 and 20, where appropriate.

Each of the cables 34 and 36 is connected, at a portion that projects from an end of an outer tube of the inner cable 64 toward the brake, to the brake lever 62. In addition, each of the cables 34 and 36 is connected, at another portion that projects from the other end of the outer tube, to a clutch-equipped motion-conversion mechanism 72. The clutch-equipped motion-conversion mechanism 72 converts the rotation of the brake motor 30 into a liner motion, and transfers the drive power produced by the brake motor 30 to the cables 34 and 36. As shown in FIG. 2, the clutch-equipped motion-conversion mechanism 72 includes a gear train 80, a clutch 82, which serves as a brake application retention mechanism, a screw mechanism 84, etc. The gear train 80 is formed of multiple gears 86, 88, and 90. The gear 86 is meshed with an output shaft 92 of the brake motor 30, and the rotation of the gear 86 is transferred to the gear 90 via the gear 88. A drive power transfer unit 94, which projects in the axial direction of the clutch-equipped motion-conversion mechanism 72, is fitted to the end face of the gear 90, which is opposite to the brake motor 30. The clutch 82 is a one-way clutch. As shown in FIG. 3, the clutch 82 includes a housing 100, a coil spring 102, which is provided on the inner peripheral side of the housing 100, and a rotor 106 that is able to rotate together with an output shaft 104 of the clutch 82. The coil spring 102 is fitted to the housing 100 with the diameter elastically compressed slightly. The outer peripheral face of the coil spring 102 is closely fitted to the inner peripheral face of the housing 100, and end portions 108 and 110 of wires project toward the center of the clutch 82. The drive power transfer unit 94 of the gear 90 is positioned in one of the two spaces defined by the two end portions 108 and 110, and the rotor 106 is positioned in the other space.

When the gear 90 rotates in accordance with the rotation of the brake motor 30, the drive power transfer unit 94 contacts one of the end portions 108 and 110, and the coil spring 102 is compressed, whereby frictional force between the inner peripheral face of the housing 100 and the outer peripheral face of the spring 102 decreases. This enables the coil spring 102 and the rotor 106 to rotate. Then, the output shaft 104 rotates. The output shaft 104 rotates together with the gear 90. Therefore, the rotation of the brake motor 30 is transferred to the output shaft 104 by the clutch 82. If torque is applied to the output shaft 104 under the condition where electric currents are not supplied to the brake motor 30 (under the condition where the brake motor 30 is not operating), the rotor 106 contacts one of the end portions 108 and 110. Thus, the diameter of the coil spring 102 is increased. Thus, frictional force between the outer peripheral face of the coil spring 102 and the inner peripheral face of the housing 100 increases. This interrupts the rotation of the coil spring 102. Transfer of torque from the output shaft 104 to the gear 90 is interrupted by the clutch 82. Under the condition where electric currents are not supplied to the brake motor 30, the torque applied to the output shaft 104 does not rotate the brake motor 30.

The screw mechanism 84 includes a housing 120, an external screw member 122 that extends in the direction parallel to the axis line L, a nut (not shown) that is screwed with the external screw member 122, and an equalizer 124 that is fitted to the nut so as to be pivotable about the axis line M. The external screw member 122 is supported by the housing 120 via paired radial bearings 125 (one of the radial bearings 125 is not shown), and a needle thrust bearing 126 in such a manner that the external screw member 122 is rotatable relative to the housing 120. The inner cable 64 of the cable 34 and the inner cable 64 of the cable 36 are coupled with respective arms of the equalizer 124. An engaging projection portion 128 is formed on a main body of the equalizer 124, and is engaged with a guide (not shown) that is provided to the housing 120 and that extends in the direction parallel to the axis line L. As a result, the equalizer 124 is not able to rotate about the axis line L with respect to the housing 120, but is able to move relative to the housing 120 in the direction parallel to the axis line L and pivot about the engaging projection portion 128 (about the axis line M).

The equalizer 124 is movable relative to the housing 120, between the position indicated by the solid lines and the position indicated by the chain double-dashed lines. The inner cables 64 of the cables 34 and 36 are pulled or slackened in accordance with the relative movement of the equalizer 124. The equalizer 124 pivots about the engaging projection portion 128 (about the axis line M) so that the tensions applied to the inner cables 64 of the two cables 34 and 36 (hereinafter, referred to as "tensions of the cables 34 and 36", where appropriate) are equal to each other. A tension sensor 130 that detects the tension applied to the inner cable 64 of the cable 36 is provided in the housing 120. Because the tensions applied to the cables 34 and 36 are equalized by the equalizer 124, the tension of the cable 36 detected by the tension sensor 130 is equal to the tension of the cable 34. FIG. 2 shows a malfunction-time brake release unit 132. For example, when the brake motor 30 malfunctions, the malfunction-time brake release unit 132 releases the parking brakes 18 and 20. In the embodiment of the invention, the brakes 18 and 20, the brake motor 30, the clutch-equipped motion-conversion mechanism 72, the cables 34 and 36, etc. form the electric parking brake mechanism 10. In the embodiment of the invention, the motion-conversion mechanism 72 includes the clutch 82. However, it is not absolutely necessary to provide the clutch 82 in the motion-conversion mechanism 72. When the motion-conversion mechanism 72 includes a worm and a worm gear, the same function is exhibited.

Figure 5:
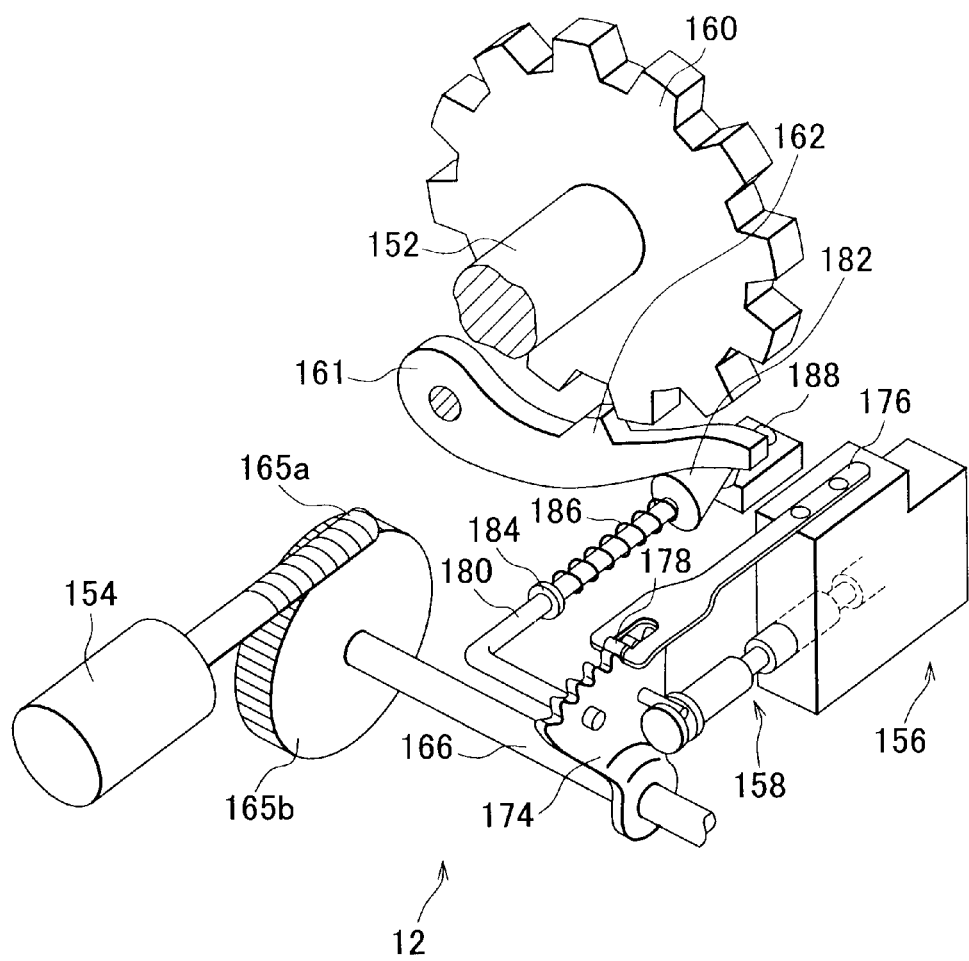
FIG. 5 is a perspective view schematically showing an electric parking lock mechanism included in the vehicle parking system.

As shown in FIGS. 1 and 5, the electric parking lock mechanism 12 mechanically interrupts the rotation of an output shaft 152 (hereinafter, referred to as "drive power transfer shaft 152") of an automatic transmission 150. The electric parking lock mechanism 12 includes a first electric motor 154, which serves as a first electromagnetically-driven actuator. The state is changed, by the first electric motor 154 (hereinafter, referred to as "parking lock motor 154"), between the state in which the rotation of the drive power transfer shaft 152 is permitted and the state in which the rotation of the drive power transfer shaft 152 is interrupted. A spool 158 of a spool valve 156, which controls the shift range of the automatic transmission 150, is moved by the parking lock motor 154. The spool valve 156 serves as a fluid passage changing valve for setting a shift range. A line pressure is supplied to the spool valve 156. The hydraulic pressure is selectively supplied to a friction engaging device (not shown) from a discharge port that is defined based on the position of the spool 158. In the embodiment of the invention, the electric parking lock mechanism 12 is operated by driving the parking lock motor 154, and the shift range of the automatic transmission 150 is controlled also by driving the parking lock motor 154. Therefore, the parking lock motor 154 may be called a shift range changing motor.

A parking lock gear 160 is fitted to the drive power transfer shaft 152 in such a manner that the parking lock gear 160 is not able to rotate with respect to the drive power transfer shaft 152. When a parking pawl 162 of a lock lever 161 is engaged with the parking lock gear 160, the rotation of the drive power transfer shaft 152 is interrupted. The drive power transfer shaft 152 transfers the rotational torque from an output shaft of an engine 164 (see FIG. 1), which serves as a drive power source, to the drive wheels 14 and 16 (in the embodiment of the invention, the rear wheels 14 and 16 serve as the drive wheels). When the rotation of the drive power transfer shaft 152 is interrupted, the rotation of the drive wheels 14 and 16 is also interrupted. When the shift range of the automatic transmission 150 is Park, the rotation of the engine 164 is not transferred to the drive power transfer shaft 152. "A change in the shift range of the automatic transmission 150 between a shift range other than Park and Park" is in conjunction with "a change in the state between the state in which the rotation of the drive power transfer shaft 152 is permitted and the state in which the rotation of the drive power transfer shaft 152 is interrupted".

As shown in FIG. 5, the rotation of the parking lock motor 154 is transferred to a control shaft 166 via paired worm gear 165a and worm wheel 165b. The rotational speed of the parking lock motor 154 is reduced by the worm gear 165a and the worm wheel 165b. A detent lever 174 is fitted to the control shaft 166 in such a manner that the detent lever 174 is not able to rotate with respect to the control shaft 166. Multiple projections and recesses are formed on an outer peripheral face of the detent lever 174, and a roller 178 of a detent spring 176 is selectively engaged in one of the recesses. The detent lever 174, the detent spring 176, etc. constitute a detent mechanism. The spool 158 is engaged with the detent lever 174. The spool 158 is moved linearly in its axial direction as the detent lever 174 pivots due to the rotation of the control shaft 166. The position of the spool 158 is determined by the detent mechanism. A parking rod 180 is also engaged with the detent lever 174. The parking rod 180 is moved linearly in its axial direction as the detent lever 174 pivots. The parking rod 180 is arranged so as to be movable with respect to a cam 182. A spring 186 is provided between the cam 182 and a flange 184 that is provided at a middle portion of the parking rod 180. An engagement portion 188, which is able to be engaged with an end face of the cam 182, is provided at an end portion of the parking rod 180. The lock lever 161 is engaged with the outer peripheral face of the cam 182. The lock lever 161 pivots as the cam 182 is moved in its axial direction, whereby the parking pawl 162 is engaged with the parking lock gear 160 or disengaged from the parking lock gear 160.

When the control shaft 166 is rotated in accordance with the rotation of the parking lock motor 154, the detent lever 174 pivots. As the detent lever 174 pivots, the spool 158 is moved in its axial direction and the parking rod 180 is moved in its axial direction. The spool 158 is moved to a position determined based on the selected shift position. When the selected shift position is a shift position other than Park, the parking rod 180 is moved by a small amount, and an elastic force of the spring 186 is small. The parking rod 180 is moved in its axial direction with respect to the cam 182, and the cam 182 does not move forward. When the parking lock motor 154 is rotated until a position corresponding to Park is reached and the detent lever 174 pivots to a position corresponding to Park, the cam 182 is moved forward with respect to the parking rod 180 by an elastic force of the spring 186. Then, the lock lever 162 pivots and the parking pawl 162 is engaged with the parking lock gear 160, whereby the rotation of the drive power transfer shaft 152 is mechanically interrupted. When the parking lock motor 154 is rotated in the reverse direction, the parking rod 180 is moved backward. Then, the engagement portion 188 contacts the end face of the cam 182, and the cam 182 moves backward as the parking rod 180 moves backward. The lock lever 161 pivots and the parking pawl 162 is disengaged from the parking lock gear 160, whereby the rotation of the drive power transfer shaft 152 is permitted. In the embodiment of the invention, the parking lock motor 154, the worm gear 165a, the worm wheel 165b, the control shaft 166, the parking rod 180, the parking lock gear 160, the cam 182, the lock lever 161 with the parking pawl 162, etc. constitute the parking lock mechanism 12. Also, the worm gear 165a, the worm wheel 165b, etc. constitute a locked-state maintaining mechanism.

As shown in FIG. 1, the brake motor 30 of the electric parking brake mechanism 10 is controlled based on a command from an electric parking brake ECU (PKBECU) 200. The electric parking brake ECU 200 is mainly formed of a computer, and includes an input/output unit 202, an execution unit 204, a storage unit 206, etc. A parking brake switch (hereinafter, referred to as "parking switch") 210, and the tension sensor 130 are connected to the input/output unit 202. The brake motor 30 is also connected to the input/output unit 202 via a drive circuit 212 (including switches, etc.). The parking lock motor 154 of the electric parking lock mechanism 12 is controlled based on a command from a shift-by-wire ECU (SBWECU: hereinafter, referred to as "electric parking lock ECU") 220. The electric parking lock ECU 220 is also mainly formed of a computer, and includes an input/output unit 222, an execution unit 224, a storage unit 226, etc. A shift position selection switch 230, a rotational angle sensor 232, which detects the rotational angle of the parking lock motor 154, an ammeter 234, which detects the magnitude of an electric current supplied to the parking lock motor 154, etc. are connected to the input/output unit 222. The parking lock motor 154 is also connected to the input/output unit 222 via a drive circuit 225 (including switches, etc.). A power supply unit 236 is connected to and shared by the electric parking brake mechanism 10 and the electric parking lock mechanism 12. Electric currents are supplied to the brake motor 30 and the parking lock motor 154 from the power supply unit 236. In the embodiment of the invention, both the brake motor 30 and the parking lock motor 154 are direct-current motors (brushless motors or non-brushless motors may be employed as the brake motor 30 and the parking lock motor 154). The power supply unit 236 is a direct-current power supply unit (for example, a unit including a battery). The electric parking brake ECU 200 and the electric parking lock ECU 220 are connected to each other via a CAN (Controller Area Network) 240. The information is provided via the CAN 240. For example, the information indicating a shift position selected in response to an operation of the shift position selection switch 230, the information indicating the on/off state of an operation-permission flag, which will be described later in detail, etc. are provided via the CAN 240.

The parking switch 210 is operated to issue a command to apply the parking brakes 18 and 20 or to release the parking brakes 18 and 20. For example, the parking switch 210 may have an application operation unit and a release operation unit. When the application operation unit is operated (when an application command operation is performed), it is determined that the parking brakes 18 and 20 are required to be applied. When the release operation unit is operated (when a release command operation is performed), it is determined that the parking brakes 18 and 20 are required to be released. The shift position selection switch 230 has multiple operation portions such as Drive, Reverse, Neutral and Park, as shown in FIG. 1. The operation position of the shift position selection switch 230 is detected by an operation position detection unit. When the operation position is changed, a shift signal turns from OFF to ON. Also, the information indicating the selected shift position corresponding to the operation position is provided to the electric parking lock ECU 220.

Next, the operation of the parking system thus structured will be described. When the parking switch 210 is operated to apply the parking brakes 18 and 20, the brake motor 30 is started (supply of electric currents from the power supply unit 236 to the brake motor 30 is started). The cables 34 and 36 are pulled, whereby the parking brakes 18 and 20 are applied. When the tension of the cables reaches the target tension, the brake motor 30 is stopped (supply of electric currents is stopped). At the target tension, the vehicle can be kept at standstill. Even when supply of electric currents to the brake motor 30 is stopped (the brake motor 30 is stopped) while the parking brakes 18 and 20 are applied, the friction member pushing force is maintained in the brakes 18 and 20 by the clutch 82. If the parking switch 210 is operated to release the parking brakes 18 and 20 while the parking brakes 18 and 20 are applied, the brake motor 30 is started and rotated in the direction opposite to the direction in which the brake motor 30 is rotated when the parking brakes 18 and 20 are applied. The cables 34 and 36 are slackened and the distance between the paired brake shoes 50a and 50b is reduced by the return spring 54 in each of the drum brakes 18 and 20, whereby the brakes are released. When the cables 34 and 36 are slackened and the brakes 18 and 20 are released, the brake motor 30 is stopped.

When the shift position selection switch 230 is operated (when the selected shift position is changed), the shift signal turns from OFF to ON and the parking lock motor 154 is started (supply of electric currents from the power supply unit 236 is started). When the rotational angle of the parking lock motor 154 reaches the target angle and the spool 158 is moved to a position corresponding to the selected shift position, the parking lock motor 154 is stopped (supply of electric currents is stopped). The target angle is determined based on the shift position selected in response to an operation of the shift position selection switch 230. When the selected shift position is changed between positions other than Park, even if the parking rod 180 is moved, the cam 182 is not moved and the rotation of the drive power transfer shaft 152 is not interrupted, as described above. When the selected shift position is changed from a shift position other than Park to Park, the shift position of the automatic transmission 150 is brought to Park by controlling the spool valve 156. The cam 182 is moved forward, the lock lever 162 pivots, and the parking pawl 162 is engaged with the parking lock gear 160, whereby the rotation of the drive power transfer shaft 152 is mechanically interrupted. When the rotational angle of the parking lock motor 154 reaches the target rotational angle, the parking lock motor 154 is stopped (supply of electric currents to the parking lock motor 154 is stopped). The situation where the parking lock motor 154 is rotated by a force applied to the control shaft 166 from the worm gear 165a and the worm wheel 165b does not occur. Therefore, the rotation of the drive power transfer shaft 152 is kept interrupted. When the selected shift position is changed from a shift position other than Park to Park, the parking brakes 18 and 20 are also applied (the parking brakes 18 and 20, which have been released, are applied). In the embodiment of the invention, when the selected shift position is changed from a shift position other than Park to Park in response to an operation of the shift position selection switch 230, the parking lock mechanism 12 is operated and the parking brake mechanism 10 is also operated. Therefore, the parking lock motor 154 is started and the brake motor 30 is also started.

When the selected shift position is changed from Park to a shift position other than Park, the parking rod 180 is moved backward and the cam 182 is moved backward. The lock lever 161 pivots, and the parking pawl 162 is disengaged from the parking lock gear 160, whereby the rotation of the drive power transfer shaft 152 is permitted. Also, the spool 158 is moved, and the shift position of the automatic transmission 150 is changed to the selected shift position due to the movement of the spool 158. When the selected shift position is changed from Park to a shift position other than Park, the parking brakes 18 and 20, which have been applied, are released. In the embodiment of the invention, when the selected shift position is changed from Park to a shift position other than Park in response to an operation of the shift position selection switch 230, the parking lock mechanism 12 is released and the parking brake mechanism 10 is also released. Therefore, the parking lock motor 154 is started and the brake motor 30 is also started.

Figure 6A:
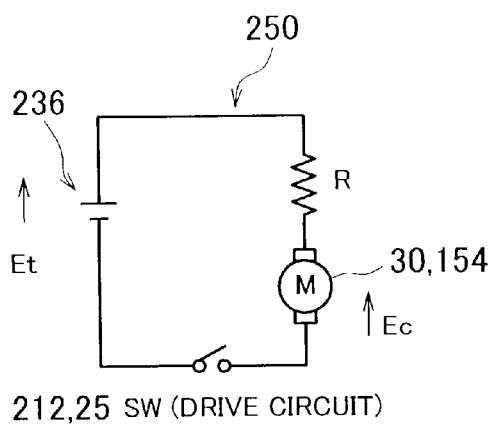
FIG. 6A is a simplified view showing an electric circuit for an electric motor included in the vehicle parking system.

It is known that a large magnitude of striking current is supplied to each of the brake motor 30 and the parking lock motor 154 when these motors are started. FIG. 6A shows an electric circuit 250 that includes the power supply unit 236, the brake motor 30 or the parking lock motor 154, and the drive circuit (switch) 212 or 225. Hereafter, the circuit that includes the brake motor 30 will be described. The following description may be applied to the circuit that includes the parking lock motor 154. When the output voltage from the power supply unit 236 is denoted by Et, the counterelectromotive force that is generated when the brake motor 30 is operated is denoted by Ec, and the resistance in the entirety of the electric circuit 250 is denoted by R (including the resistance in the brake motor 30 itself, the resistance in the wire included in the electric circuit 250, etc.), the magnitude of the electric current i that is supplied to the brake motor 30 is expressed by Equation 1.

$$i=(Et-Ec)/R \qquad \text{Equation 1}$$

The counterelectromotive force Ec is expressed by Equation 2.

$$Ec=K\times\phi\times n \qquad \text{Equation 2}$$

K is a coefficient, $\phi$ is a magnetic field flux, and n is a rotational speed of the brake motor 30. When the brake motor 30 starts, namely, when the brake motor 30 is not yet rotating, the rotational speed n is 0, and the counterelectromotive force is 0. Therefore, if the rotational speed and the counterelectromotive force are substituted into Equation 2, the magnitude of the electric current that is expressed by Equation, ia=Et/R. After the brake motor 30 starts rotating, the counterelectromotive force Ec becomes greater than 0. When the counterelectromotive force increases with an increase in the rotational speed n, the magnitude of the electric current supplied to the brake motor 30 decreases. The magnitude of the electric current that is supplied to the brake motor 30 changes in a manner shown in FIG. 6B, that is, the magnitude of the electric current that is supplied to the brake motor 30 increases, reaches the peak value imax and then decreases. It is known that the peak value imax of the striking current i is larger as the capacity of an electric motor is higher. In the embodiment of the invention, if comparisons are made between the drive power (the drive power that is required for the actual brake application, and that corresponds to the peak value ic of an electric current that is supplied to the brake motor 30 during the actual brake application) that is required to pull the cables 34 and 36 (pulling the cables 34 and 36 will be referred to as "actual brake application") in the electric parking brake mechanism 10, and the drive power that is required to cause the lock lever 161 to pivot in the electric parking lock mechanism 12, the drive power that is required to pull the cables 34 and 36 is greater. Therefore, the peak value imax of a striking current that is supplied to the brake motor 30 is larger than the peak value imax of a striking current that is supplied to the parking lock motor 154. The peak value imax of the striking current is larger than the electric current ic that is supplied to the brake motor 30 during the actual brake application.

Therefore, in the embodiment of the invention, when both the electric parking brake mechanism 10 and the electric parking lock mechanism 12 are operated, the brake motor 30 and the parking lock motor 154 are started at staggered times so that the times at which the magnitudes of the striking currents reach their peaks do not coincide with each other. The parking lock motor 154 is started first, and then the brake motor 30 is started. The parking lock motor 154, to which the striking current having a smaller peak value imax is supplied, is started first. For example, when the voltage of the power supply unit 236 is low, if the brake motor 30, to which the striking current having a larger peak value imax is supplied, is started first and the amount of electric current consumed in the power supply unit 236 increases, the voltage of the power supply unit 236 may significantly drop and the power supply unit 236 may be unusable. In contrast, if the parking lock motor 154, to which the striking current having a smaller peak value imax is supplied, is started first, it is possible to suppress occurrence of the situation in which the voltage of the power supply unit 236 significantly drops and the power supply unit 236 becomes unusable immediately.

Figure 6B:
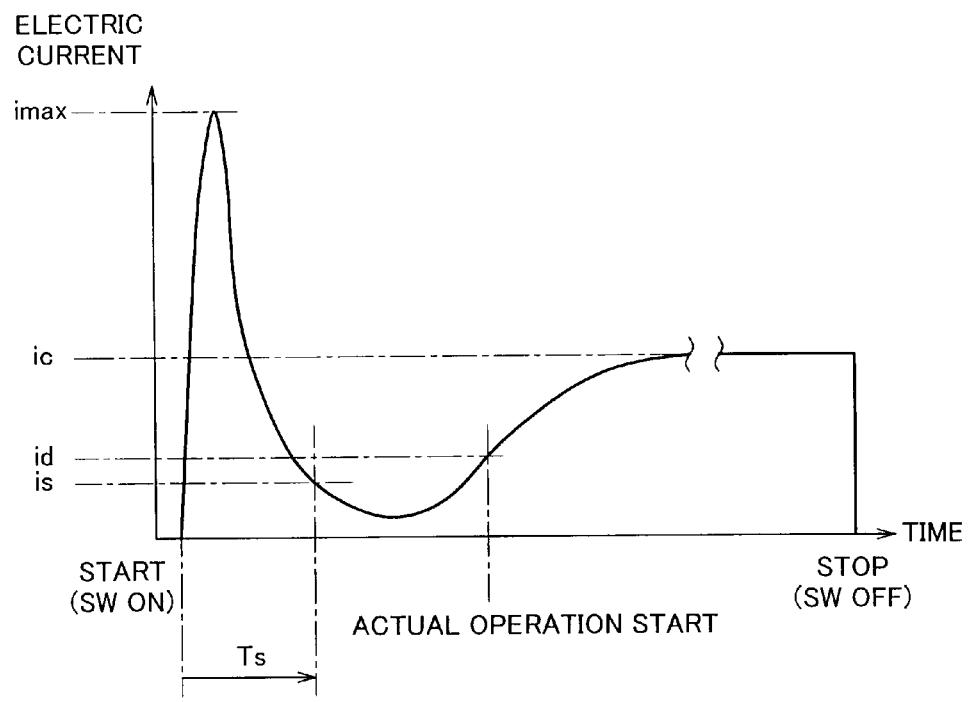
FIG. 6B is a graph showing a time change in the magnitude of an electric current supplied to the electric motor included in the vehicle parking system.
Figure 7:
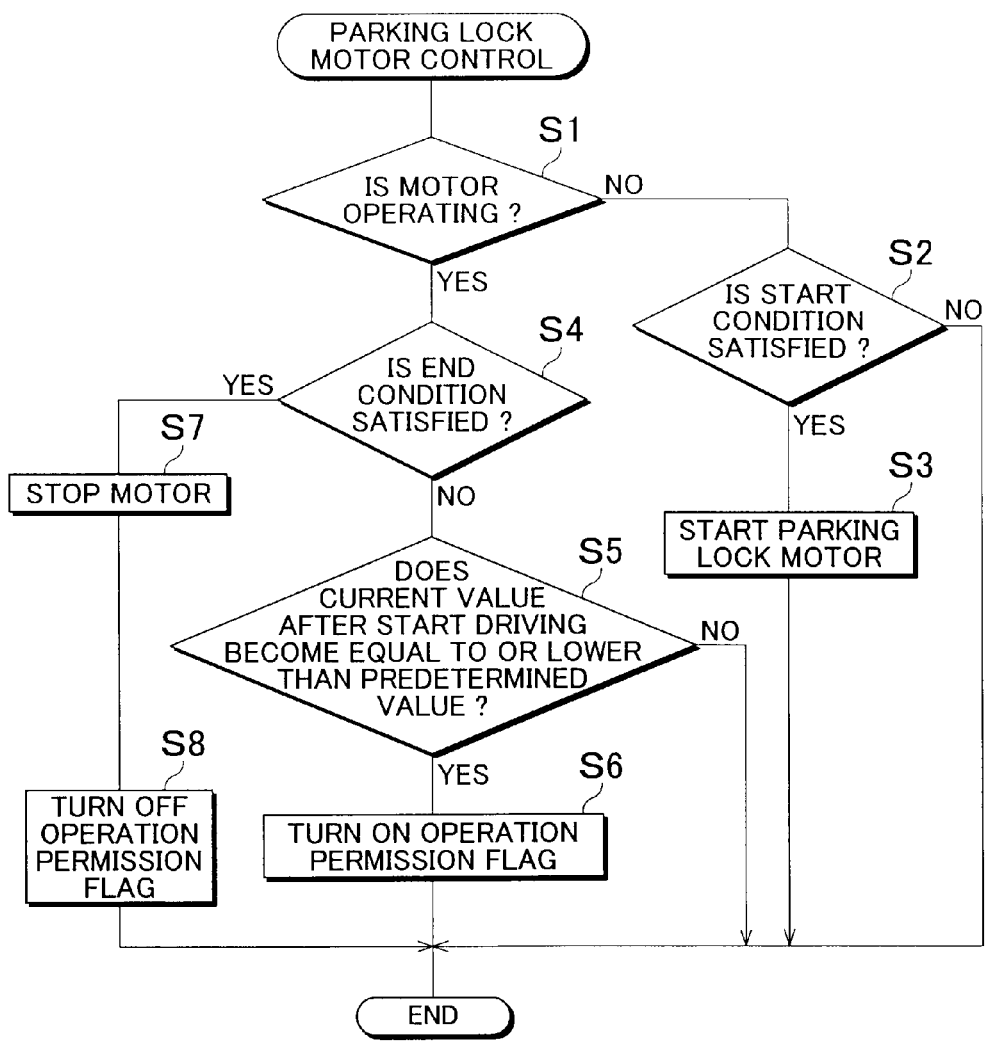
FIG. 7 is a flowchart indicating a parking lock motor control program stored in an electric parking lock ECU included in the vehicle parking system.

The electric parking lock ECU 220 executes a parking lock motor control program indicated in a flowchart in FIG. 7 at predetermined time intervals of, for example, several milliseconds. In step (hereinafter, referred to as "S") 1, it is determined whether the parking lock motor 154 is operating, namely, whether electric currents are being supplied to the parking lock motor 154. When it is determined that the parking lock motor 154 is not operating, it is then determined in S2 whether the start condition is satisfied. The start condition is a condition that a shift signal turns from OFF to ON, that is, the shift position selection switch 230 is operated (the selected shift position is changed). The condition that the selected shift position is changed includes the condition that the selected shift position is changed from a shift position other than Park to Park, the condition that the selected shift position is changed from Park to a shift position other than Park, and the condition that the shift position is changed between the shift positions other than Park. When it is determined that the start condition is not satisfied, S1 and S2 are periodically executed. When the shift position selection switch 230 is operated and the start condition is satisfied, the parking lock motor 154 is started in S3 (the switch in the drive circuit 225 is turned on). When S1 is executed next time, an affirmative determination is made because the parking lock motor 154 is operating. Then, it is determined in S4 whether the end condition is satisfied. It is determined whether the actual rotational angle of the parking lock motor 154, which is detected by the rotational angle sensor 232, has reached the target angle that is determined by the selected shift position. When it is determined that the actual rotational angle has reached the target angle, it is determined that the end condition is satisfied. When it is determined that the end condition is not satisfied, it is then determined in S5 whether the magnitude of the electric current supplied to the parking lock motor 154, which is detected by the ammeter 234, is changed from a value that is larger than the predetermined value "is" to a value that is equal to or smaller than the predetermined value "is". That is, it is determined whether the magnitude of the striking current decreases to a value equal to or smaller than the predetermined value "is" after passing its peak as shown in FIG. 6B. As shown in FIG. 6B, when the magnitude of the striking current has not reached its peak or when the magnitude of the striking current is larger than the predetermined value "is" even after passing its peak, a negative determination is made in S5. When the magnitude of the striking current passes its peak and then decreases to a value equal to or smaller than the predetermined value "is" while S1, S4 and S5 are periodically executed, an affirmative determination is made in S5. Then, an operation permission flag is set (turned on) in S6. Because the operation permission flag is used to indicate that the magnitude of the striking current has become substantially equal to the target value, the operation permission flag may be called a completion flag. An affirmative determination is made in S5 when the magnitude of the striking current becomes equal to or smaller than the predetermined value "is" after passing its peak (once) in the transitional state. After that, a negative determination is made in S5. Therefore, before the end condition is satisfied, S1, S4 and S5 are periodically executed, and the parking lock motor 154 is actually operated. When the end condition is satisfied, an affirmative determination is made in S4, and the parking lock motor 154 is stopped and the operation permission flag is reset (turned off) in S7.

Figure 8:
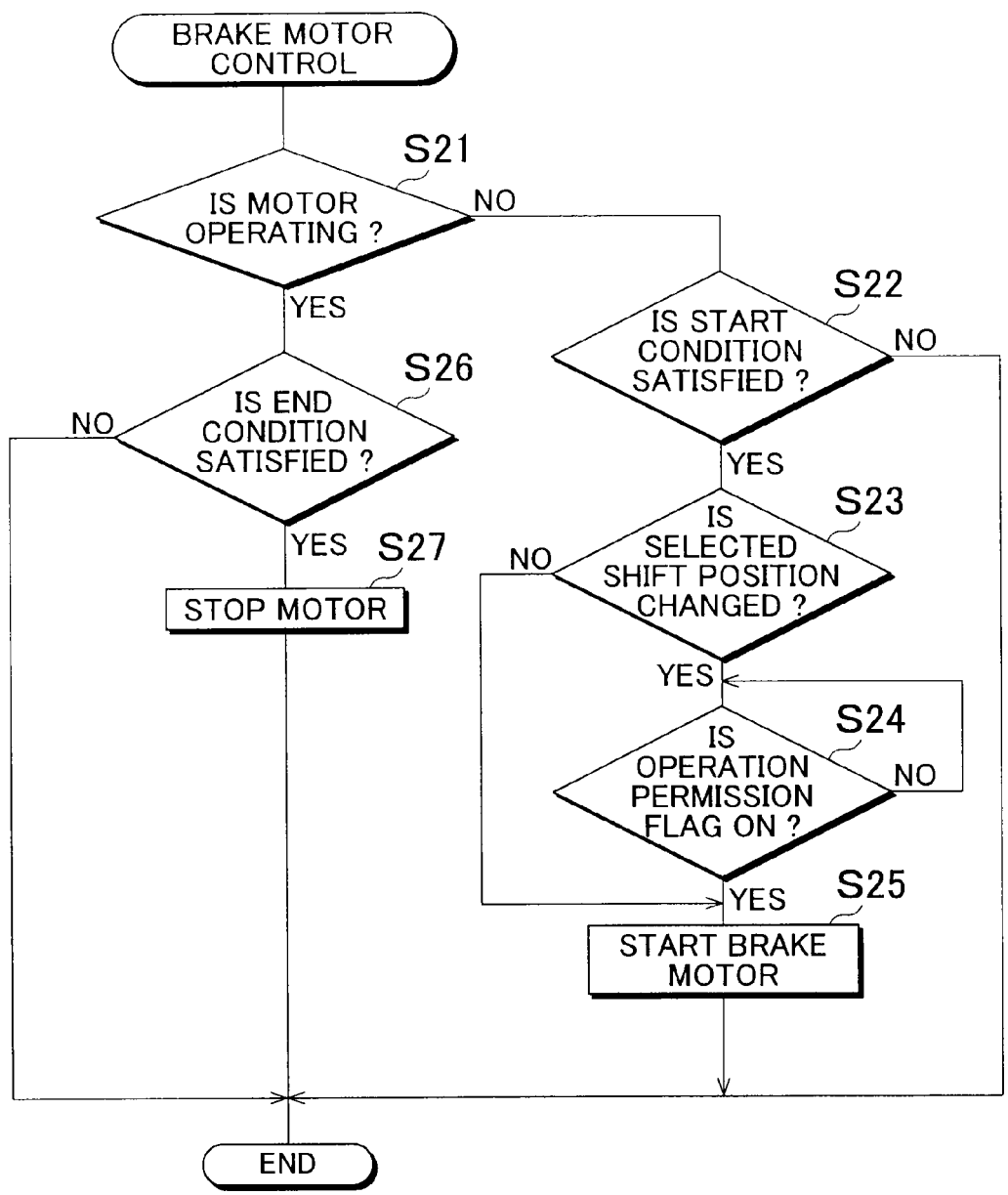
FIG. 8 is a flowchart indicating a brake motor control program stored in an electric parking brake ECU included in the vehicle parking system.

The electric parking brake ECU 200 executes a brake motor control program indicated in a flowchart in FIG. 8 at predetermined time intervals of, for example, several milliseconds. It is determined in S21 whether the brake motor 30 is operating. As in the above-described case, it is determined whether electric currents are being supplied to the brake motor 30 from the power supply unit 236. When it is determined that the brake motor 30 is not operating, it is determined in S22 whether the start condition is satisfied. In the embodiment of the invention, when the parking switch 230 is operated to apply or release the brakes, when the selected shift position is changed from a shift position other than Park to Park, or when the selected shift position is changed from Park to a shift position other than Park, it is determined that the start condition is satisfied. When the start condition has not been satisfied, S21 and S22 are periodically executed. When the start condition is satisfied, it is determined in S23 whether the start condition is satisfied because the selected shift position is changed from a shift position other than Park to Park or the selected shift position is changed from Park to a shift position other than Park. When it is determined that the start condition is satisfied due to a change in the selected shift position, an affirmative determination is made in S23. In S24, it is determined whether the operation permission flag has been set (is on). When the operation permission flag has not been set in the parking lock motor control program, namely, when the magnitude of the striking current is larger than the predetermined value "is", a negative determination is made in S24, and the brake motor 30 is not started. When the magnitude of the striking current becomes equal to or smaller than the predetermined value "is" and the operation permission flag has been set, an affirmative determination is made in S24, and the brake motor 30 is started (the switch of the drive circuit 212 is turned on). When the start condition is satisfied due to the factor other than a change in the selected shift position, namely, due to the operation of the parking switch 210, a negative determination is made in S23. In this case, S24 is not executed, and the brake motor 30 is immediately started in S25.

When the brake motor 30 is operating, an affirmative determination is made in S21, and it is determined in S26 whether the end condition is satisfied. In the embodiment of the invention, it is determined whether the actual tension of the cables 34 and 36, which is detected by the tension sensor 130, has reached the target tension. At the target tension, the vehicle is maintained at standstill when the brakes are applied. When the brakes are released, the target tension is equal to or lower than a predetermined value (for example, 0). Before the end condition is satisfied, S21 and S26 are periodically executed. When the target tension is achieved, it is determined that the end condition is satisfied, and operation of the brake motor 30 is stopped in S27. Even if supply of electric currents to the brake motor 30 is stopped, the friction member pushing force is maintained by the clutch 82. On the other hand, even if a force is applied to the cables 34 and 36, the brake motor 30 is not operated.

Figure 9:
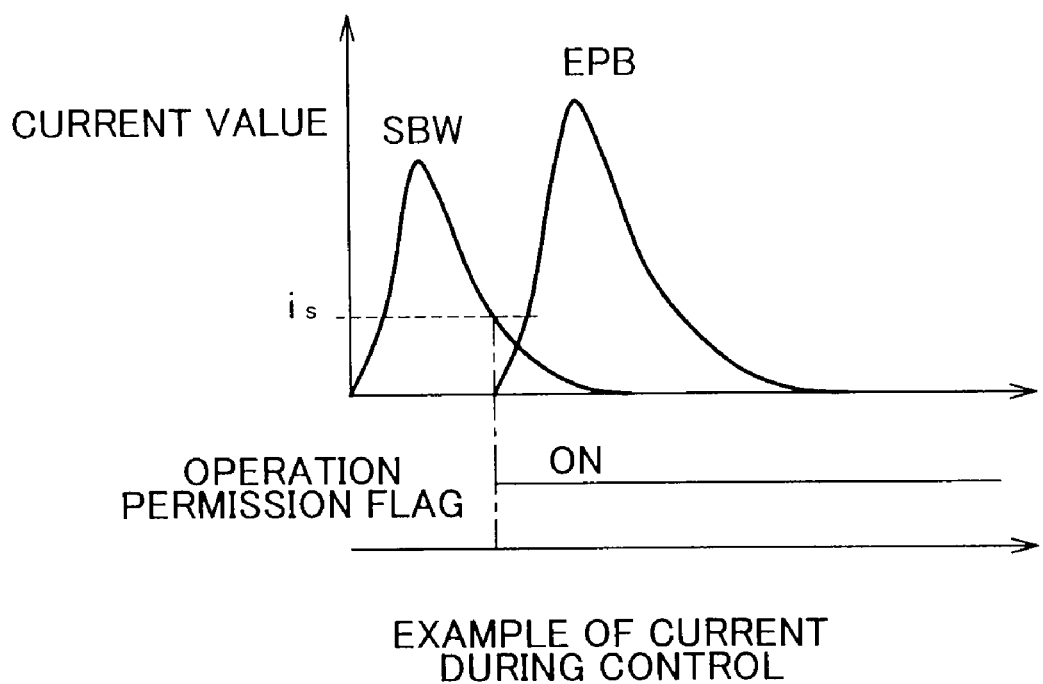
FIG. 9 is a graph showing the operating states of electric motors included in the vehicle parking system.

As described above, in the embodiment of the invention, the brake motor 30 and the parking lock motor 154 are started at staggered times so that the times at which the magnitudes of the striking currents reach their peaks do not coincide with each other, as shown in FIG. 9. As a result, a large magnitude of the electric current need not be supplied from the power supply unit 236, and therefore occurrence of a significant voltage drop is suppressed. Therefore, it is possible to operate the brake motor 30 and the parking lock motor 154 stably. In addition, the parking lock motor 154, to which an electric current having a smaller peak value is supplied, is started first. Therefore, even if the voltage of the power supply unit 236 is low, the power supply unit 236 does not become unusable.

Further, the brake motor 30 is started when the magnitude of the striking current that is supplied to the parking lock motor 154 becomes equal to or smaller than a predetermined value. Therefore, it is possible to start the brake motor 30 earlier while suppressing occurrence of an excessive increase in the electric current consumed in the power supply unit 236. Accordingly, a delay in the application of the parking brakes 18 and 20 is minimized. In this case, the magnitude of the electric current that is actually supplied to the parking lock motor 154 is detected. When the magnitude of the electric current becomes equal to or smaller than a predetermined value, the brake motor 30 is started. Therefore, it is possible to suppress occurrence of an excessive increase in the electric current consumed in the power supply unit 236. Also, even if a starter is not provided, it is possible to suppress occurrence of an excessive increase in the electric current consumed in the power supply unit 236. As described above, according to the embodiment of the invention, a unit of the electric parking brake ECU 200, which stores the parking motor control program, a unit of the electric parking brake ECU 200, which executes the parking motor control program, a unit of the electric parking lock ECU 220, which stores the shift change motor control program, a unit of the electric parking lock ECU 220, which executes the shift change motor control program, etc. constitute an electromagnetically-driven actuator control unit. The electromagnetically-driven actuator control unit serves also as a peak staggering electromagnetically-driven actuator control unit and a peak consumption current-based electromagnetically-driven actuator control unit. In the electromagnetically-driven actuator control unit, a unit of the electric parking brake ECU 200, which stores S24 and S25 of the parking motor control program, a unit of the electric parking brake ECU 200, which stores S24 and S25 of the parking motor control program, a unit of the electric parking brake ECU 200, which executes S24 and S25 of the parking motor control program, etc. constitute a post-current reduction control-start unit.

In the embodiment of the invention, the parking lock motor 154 is started first. Alternatively, the brake motor 30 may be started first. In this case, the operation permission flag is set in the brake motor control program, and the magnitude of the electric current that is supplied to the brake motor 30 is detected. When the selected shift position is changed between Park and a shift position other than Park and the start condition is satisfied, the brake motor 30 is started immediately. When the magnitude of the striking current decreases from a value larger than the predetermined value "is" to a value equal to or smaller than the predetermined value "is", the operation permission flag is set. When the shift position is changed between Park and a shift position other than Park in the parking lock motor control program, it is determined whether the operation permission flag has been set. When the operation permission flag has not been set, the parking lock motor 154 is not started. On the other hand, when the operation permission flag has been set, the parking lock motor 154 is started. In the embodiment of the invention described above, the start timing for the brake motor 30 is determined based on the magnitude of the electric current that is supplied to the parking lock motor 154 which is started first. Alternatively, the start timing for the brake motor 30 may be determined based on the time that has elapsed since the parking lock motor 154 is started. It is not absolutely necessary to set the start timing for the brake motor 30 to a time at which the magnitude of the striking current becomes equal to or smaller than a predetermined value. For example, the start timing for the brake motor 30 may be set to "a time at which the operation of the parking lock motor 154 is actually started" or "a predetermined time in a period from when the magnitude of the striking current becomes small until when the operation of the parking lock motor 154 is actually started". In the actual operating state, the brake motor 30 and the parking lock motor 154 are started at staggered times so that the times at which the peak currents are supplied to these motors do not coincide with each other. In the embodiment of the invention described above, when the selected shift position is changed between Park and a shift position other than Park, both the brake motor 30 and the parking lock motor 154 are operated. Alternatively, the invention may be applied to a case in which the operation of the parking switch 210 and the operation of the shift position selection switch 230 are performed at the same time. In the embodiment of the invention, both the electric parking brake mechanism 10 and the electric parking lock mechanism 12 are operated. However, the invention may be applied to other cases. For example, the invention may be applied to a case in which at least two of an electric brake unit, a power steering unit, a power window unit, a power seat unit, a power slide door unit, a roof opening/closing unit, an air-conditioner, etc. are operated at the same time, a case in which at least two of a throttle opening amount adjustment unit, a fuel supply control unit, a cooling unit, etc. provided in an engine unit are operated at the same time. In addition, the invention may be applied to a case in which commands to start a pump motor, which is used to pressurize the hydraulic fluid and store the hydraulic fluid in an accumulator, are issued by a hydraulic brake unit and a vehicle height control unit at the same time.

In the embodiment of the invention, the electric motor is used as the electromagnetically-driven actuator. Alternatively, a solenoid valve may be used as the electromagnetically-driven actuator. In addition, the structure of the electric parking brake mechanism 10 and the structure of the electric parking lock mechanism 12 are not particularly limited. The brakes 18 and 20 may be disc brakes or drum brakes. The drive power source for the vehicle may include an engine, may include an electric motor, or may include both an engine and an electric motor. The drive wheels may be front wheels or front and rear four wheels. As described above, the invention may be implemented in various modified embodiments.

What is claimed is:

1. A vehicle parking system, comprising:
    a parking lock mechanism that is provided in a drive power transfer system of a vehicle, that includes a first electromagnetically-driven actuator which is operated by electric power supplied from a power supply unit, and that mechanically interrupts rotation of a drive power transfer shaft, which transfers drive power from a drive power source of the vehicle to a drive wheel, by operating the first electromagnetically-driven actuator;
    a parking brake mechanism that includes a brake provided to the wheel of the vehicle and a second electromagnetically-driven actuator which is operated by electric power supplied from the power supply unit, and that applies the brake by operating the second electromagnetically-driven actuator to suppress rotation of the wheel; and
    an electromagnetically-driven actuator control unit that starts the first electromagnetically-driven actuator and the second electromagnetically-driven actuator at staggered times, when both the parking lock mechanism and the parking brake mechanism are operated based on a predetermined operation command,
    wherein the electromagnetically-driven actuator control unit includes a peak consumption current-based electromagnetically-driven actuator control unit that first starts the first electromagnetically-driven actuator of the first electromagnetically-driven actuator and the second electromagnetically-driven actuator,
    wherein a peak value of the electric current consumed in the first electromagnetically-driven actuator is smaller than a peak value of the electric current consumed in the second electromagnetically-driven actuator.

2. The vehicle parking system according to claim 1, wherein the electromagnetically-driven actuator control unit includes a peak staggering electromagnetically-driven actuator control unit that starts the first electromagnetically-driven actuator and the second electromagnetically-driven actuator in such a manner that a time at which a magnitude of an electric current consumed in the first electromagnetically-driven actuator reaches a peak and a time at which a magnitude of an electric current consumed in the second electromagnetically-driven actuator reaches a peak are staggered.

3. The vehicle parking system according to claim 1, wherein the electromagnetically-driven actuator control unit includes a post-current reduction control-start unit that starts the second electromagnetically-driven actuator, when a magnitude of the electric current consumed in the first electromagnetically-driven actuator is changed from a value larger than a predetermined value to a value equal to or smaller than the predetermined value.

4. The vehicle parking system according to claim 1, wherein the electromagnetically-driven actuator control unit includes a post-current reduction control-start unit that starts one of the first electromagnetically-driven actuator and the second electromagnetically-driven actuator, when a magnitude of an electric current consumed in the other electromagnetically-driven actuator is changed from a value larger than a predetermined value to a value equal to or smaller than the predetermined value.

5. The vehicle parking system according to claim 1, wherein the electromagnetically-driven actuator control unit includes a post-actual operation-start starting unit that starts one of the first electromagnetically-driven actuator and the second electromagnetically-driven actuator after an actual operation of the other electromagnetically-driven actuator is started.

6. The vehicle parking system according to claim 1, wherein the electromagnetically-driven actuator control unit includes a post-current-increase starting unit that starts one of the first electromagnetically-driven actuator and the second electromagnetically-driven actuator, when a magnitude of an electric current consumed in the other electromagnetically-driven actuator exceeds a predetermined value after a time that has elapsed since the other electromagnetically-driven actuator is started exceeds a predetermined time.

7. The vehicle parking system according to claim 1, wherein the electromagnetically-driven control unit includes a current detection unit that detects a magnitude of an electric current that passes through one of the first electromagnetically-driven actuator and the second electromagnetically-driven actuator.

8. The vehicle parking system according to claim 1, wherein the electromagnetically-driven control unit includes a stagger control start unit that starts one of the first electromagnetically-driven actuator and the second electromagnetically-driven actuator after a predetermined time has elapsed since the other electromagnetically-driven actuator is started.

9. The vehicle parking system according to claim 1, wherein both the first electromagnetically-driven actuator and the second electromagnetically-driven actuator are electric motors.

10. The vehicle parking system according to claim 9, wherein: the parking lock mechanism includes a locked-state maintaining mechanism that maintains a state, in which rotation of the drive power transfer shaft is interrupted, with supply of an electric current to the electric motor stopped; and the parking brake mechanism includes a brake-applied state maintaining mechanism that maintains a brake-applied state, in which rotation of the wheel is suppressed, with supply of an electric current to the electric motor stopped.

11. The vehicle parking system according to claim 1, further comprising:
a shift position selection unit that selects a shift position of an automatic transmission of the vehicle, wherein the electromagnetically-driven actuator control unit includes a shift position-linked control unit that determines that an operation command is issued and starts both the first electromagnetically-driven actuator and the second electromagnetically-driven actuator, when a shift position selected by the shift position selection unit is changed from a shift position other than Park to Park or when a shift position selected by the shift position selection unit is changed from Park to a shift position other than Park.

12. The vehicle parking system according to claim 11, wherein the parking lock mechanism includes a shift position-linked control unit that changes, by operating the first electromagnetically-driven actuator, a shift position of an automatic transmission of the vehicle to Park, and changes a state from a state in which rotation of the drive power transfer shaft which extends between an output shaft of the automatic transmission and the wheel is permitted to a state in which the rotation of the drive power transfer shaft is mechanically interrupted.

13. The vehicle parking system according to claim 1, wherein: the brake is a friction brake that suppresses rotation of the wheel by pushing a friction member against a brake rotating body that rotates together with the wheel; and the parking brake mechanism includes a cable that transfers drive power from the second electromagnetically-driven actuator to the friction brake.

14. A vehicle parking system, comprising:
a parking lock mechanism that is provided in a drive power transfer system of a vehicle, that includes a first electric motor which is operated by electric power supplied from a power supply unit, and that mechanically interrupts rotation of a drive power transfer shaft, which transfers drive power from a drive power source of the vehicle to a drive wheel, by operating the first electric motor;
a parking brake mechanism that includes a brake provided to the wheel of the vehicle and a second electric motor which is operated by electric power supplied from the power supply unit, and that applies the brake by operating the second electric motor to suppress rotation of the wheel; and
an electric motor unit that starts the first electric motor and the second electric motor in such a manner that a time at which a magnitude of an electric current consumed in the first electric motor reaches a peak and a time at which a magnitude of an electric current consumed in the second electric motor reaches a peak are staggered, when both the parking lock mechanism and the parking brake mechanism are operated based on a predetermined operation command,
wherein the electric motor unit includes a peak consumption current-based electric motor control unit that first starts the first electric motor of the first electric motor and the second electric motor, and
wherein a peak value of the electric current consumed in the first electric motor is smaller than a peak value of the electric current consumed in the second electric motor.

15. A method for controlling a vehicle parking system which includes: a parking lock mechanism that is provided in a drive power transfer system of a vehicle, that includes a first electromagnetically-driven actuator which is operated by electric power supplied from a power supply unit, and that mechanically interrupts rotation of a drive power transfer shaft, which transfers drive power from a drive power source of the vehicle to a drive wheel, by operating the first electromagnetically-driven actuator; and a parking brake mechanism that includes a brake provided to the wheel of the vehicle and a second electromagnetically-driven actuator which is operated by electric power supplied from the power supply unit, and that applies the brake by operating the second electromagnetically-driven actuator to suppress rotation of the wheel, the method comprising:
starting the first electromagnetically-driven actuator and the second electromagnetically-driven actuator at staggered times, when both the parking lock mechanism and the parking brake mechanism are operated based on a predetermined operation command,
wherein the first electromagnetically-driven actuator and the second electromagnetically-driven actuator are started in such a manner that a time at which a magnitude of an electric current consumed in the first electromagnetically-driven actuator reaches a peak and a time at which a magnitude of an electric current consumed in the second electromagnetically-driven actuator reaches a peak are staggered,
wherein the first electromagnetically-driven actuator, of the first electromagnetically-driven actuator and the second electromagnetically-driven actuator, in which an electric current having a lower peak value is consumed, is started first.

16. The method according to claim 15, wherein one of the first electromagnetically-driven actuator and the second electromagnetically-driven actuator is started, when a magnitude of an electric current consumed in the other electromagnetically-driven actuator is changed from a value larger than a predetermined value to a value equal to or smaller than the predetermined value.

17. The method according to claim 15, wherein one of the first electromagnetically-driven actuator and the second electromagnetically-driven actuator is started after an actual operation of the other electromagnetically-driven actuator is started.

18. The method according to claim 15, wherein one of the first electromagnetically-driven actuator and the second electromagnetically-driven actuator is started, when a magnitude of an electric current consumed in the other electromagnetically-driven actuator exceeds a predetermined value after a time that has elapsed since the other electromagnetically-driven actuator is started exceeds a predetermined time.

19. The method according to claim 15, wherein one of the first electromagnetically-driven actuator and the second electromagnetically-driven actuator is started after a predetermined time has elapsed since the other electromagnetically-driven actuator is started.

* * * * *